No. 857,519. PATENTED JUNE 18, 1907.
W. S. FOSTER.
STRAINER SUPPORT FOR WATER PIPES.
APPLICATION FILED OCT. 17, 1906.
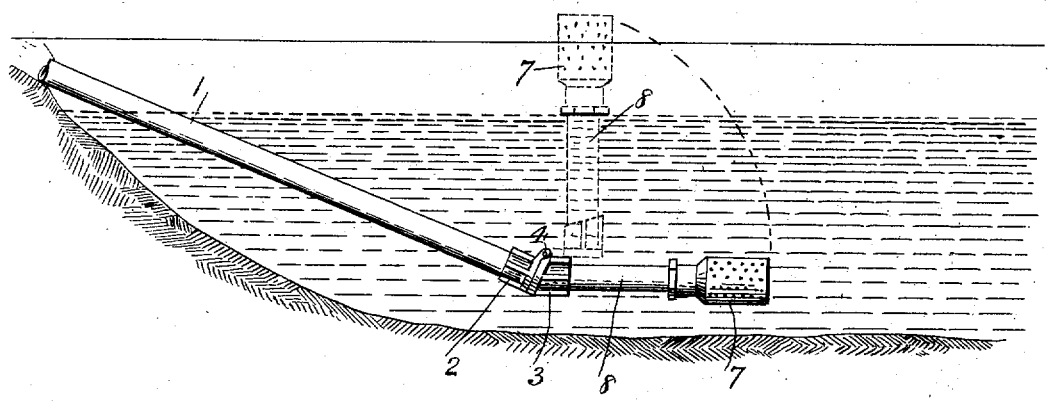
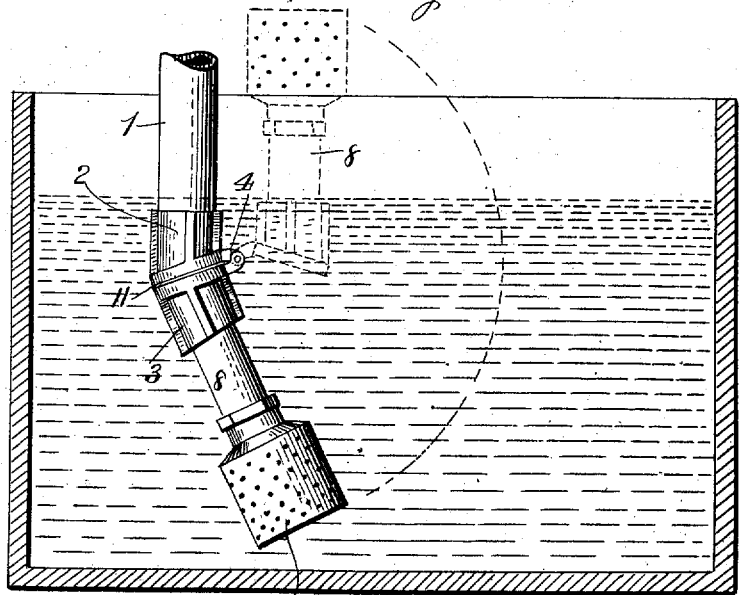
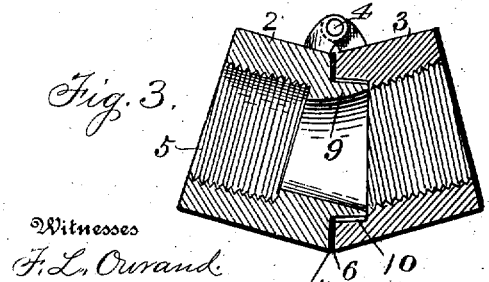
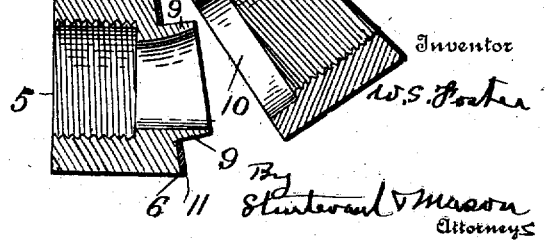
Witnesses
F. L. Ourand
Albert Popkin
Inventor
W. S. Foster
By Sturtevant & Mason
Attorneys

UNITED STATES PATENT OFFICE.

WILLIAM STUART FOSTER, OF RICHFORD, VERMONT.

STRAINER-SUPPORT FOR WATER-PIPES.

No. 857,519.   Specification of Letters Patent.   Patented June 18, 1907.

Application filed October 17, 1906. Serial No. 339,344.

*To all whom it may concern:*

Be it known that I, WILLIAM STUART FOSTER, a subject of the King of Great Britain, residing at Richford, in the county of Franklin, State of Vermont, have invented certain new and useful Improvements in Strainer-Supports for Water-Pipes, of which the following is a description, reference being had to the accompanying drawing, and to letters and figures of reference marked thereon.

My invention relates to new and useful improvements in strainer supports for pipes, and while as to some of its features it may be used for various purposes, it is more particularly adapted for supporting a strainer on the intake water pipe leading from reservoirs, wells or the like.

An object of my invention is to provide a strainer support which shall be durable, holding the strainer in proper relation to the intake pipe and at the same time allow said strainer to be readily brought to a position above the water level, whereby the same may be rendered accessible for cleaning, removing or the like.

My invention consists in the novel parts improvements and arrangements hereinafter shown and described.

In the accompanying drawings, I have illustrated one embodiment of my invention, the same serving in connection with the description herein, to illustrate the principles of my invention.

Figure 1 shows an intake pipe with my strainer support thereon and its location when leading from a reservoir. Fig. 2 is a view similar to Fig. 1, showing the position of the intake pipe and strainer when leading from a well or with the intake pipe in a vertical position. Fig. 3 is a sectional view of the coupling used in connection with my strainer support, showing the parts closed. Fig. 4 is a view similar to Fig. 3, showing the manner in which the coupling opens to allow the strainer to be brought into a position above the high water line.

In the drawings the intake pipe 1, is of the usual construction and when leading from a reservoir, as shown in Fig. 1, extends in an inclined direction relative to the surface of the water to a position below the low water mark. On the end of said intake pipe, I have arranged my improved strainer support which in the present embodiment of my invention, comprises a coupling composed of two members 2 and 3, which are hinged together at a point 4 on the upper side of the intake pipe as shown in Fig. 1. The member 2 of the coupling, has a threaded portion 5 which screws on to the end of the intake pipe. It will be obvious that any other convenient means of securing the coupling to the pipe may be substituted for that herein shown. The face 6 of the member 2 of said coupling, is inclined to the longitudinal axis of the intake pipe so that while said intake pipe is inclined to the horizontal as shown in Fig. 1, said face 6 stands substantially in a vertical plane. Projecting from the upper side of the member 2, is a perforated lug, which together with perforated lugs carried by the member 3, form the hinge 4 for the coupling. The member 3 of the coupling, also has its face inclined to the longitudinal axis of said member. This member 3 carries a short length 8 of pipe on the end of which is located a strainer 7 which as shown in the drawings is of the ordinary cylindrical form, having its surface and outer end provided with perforations. So far as my invention is concerned however, any other form of strainer may be substituted for that herein shown or the short length of pipe may have its end perforated for the same purpose.

The length of the pipe 8 is determined by the location of the strainer support relative to the high water mark. This length should be just sufficient to bring the strainer 7 above the surface of the water when the short length of pipe and member 3 are swung about the hinge 4, so that said strainer may be readily cleaned or removed if desired. The coupling 2 is provided with an extended lip 9, which engages a recessed seat 10 in the coupling 3. I have also shown in the drawings the member 2 provided with a rubber gasket 11, which fits against the face 6 of said member. This gasket however, is not a necessary feature of my invention, as the entire coupling when in use is below the low water level and does not therefore, need to be absolutely tight.

It is found that the strainer on the end of an intake pipe often becomes foul through iron rust, dirt, leaves or the like, and in order to give greater efficiency to the service requires frequent cleaning. In order to render said strainer readily accessible for cleaning, the same has been located in various places in the intake pipe. It is however, preferable to have said strainer on the end of the pipe. By my improved means of supporting the strainer, the same may be located on the end of the intake pipe and still be readily accessible. When it is desired to clean the strainer located as shown in Fig. 1, all that is necessary is to swing the short length of pipe supporting the strainer to a vertical position, which may be easily done by a cord, chain or the like. After the strainer has been cleaned or repaired, the short length of pipe is allowed to swing to its horizontal position, the weight of the strainer causing these parts to immediately swing to such position. The action of gravity, maintains the strainer in its lowered position and retains the coupling closed sufficiently tight for all practical purposes. When the strainer support is attached to a vertical intake pipe as shown in Fig. 2, the operation is precisely the same, the weight of the pipe normally retaining the pipe and the strainer in its lowered position.

It is obvious that minor changes in the details of the construction shown and described may be made without departing from the spirit of my invention.

Having thus particularly described my invention, what I claim as new and desire to secure by Letters Patent is:—

1. The combination with a main intake pipe of a strainer therefor, devices for supporting said strainer in operative relation to the free end of said intake pipe, said devices including means whereby said strainer may be moved to a position above the water line, whereby the same is rendered accessible for cleaning said supporting device also serving to properly position said strainer relative to the intake pipe when lowered; substantially as described.

2. The combination with a main intake pipe, of a strainer therefor, a short length of pipe for supporting said strainer in operative relation to the free end of said intake pipe, devices for securing said short length of pipe to said main intake pipe, said devices including means whereby said strainer may be moved to a position above the water line, and rendered accessible for cleaning and also whereby said strainer is properly positioned relative to the intake pipe when lowered; substantially as described.

3. The combination with a main intake pipe, of a strainer therefor, devices for supporting said strainer in operative relation to the free end of said intake pipe, said devices including means whereby said strainer may be moved to a position above the water line and rendered accessible for cleaning, said supporting means allowing the cleaning of the strainer without interfering with the free outflow through the intake pipe.

4. The combination with a main intake pipe, of a strainer support therefor, comprising a short length of pipe having a strainer on the end thereof and a coupling for securing said short length of pipe to the main intake pipe, said coupling forming the sole support for said short length of pipe, said short length of pipe being of such length that the strainer may be moved to a position above the water line whereby the same is rendered accessible for cleaning; substantially as described.

5. The combination with a main intake pipe of a strainer support therefor, comprising a short length of pipe having a strainer on the end thereof, a coupling for connecting said short length of pipe to said main intake pipe, the opposing faces of said coupling being so formed that the short length of pipe is held at an angle to the main intake pipe, said coupling also forming means whereby the short length of pipe may be moved so as to bring the strainer above the water line and render the same accessible for cleaning; substantially as described.

6. The combination with a main intake pipe, of a short length of pipe, a strainer carried thereby, a coupling connecting said short length of pipe to said main intake pipe, including members which are hinged together, the engaging faces of said members being inclined to the longitudinal axis of the main intake pipe, and the longitudinal axis of the short length of pipe, said coupling also forming means whereby the short length of pipe may be moved so as to bring the strainer above the water line and render the same accessible for cleaning; substantially as described.

7. The combination with a main intake pipe, a short length of pipe, a strainer carried thereby, a coupling connecting said short length of pipe to said main intake pipe including members which are hinged together, the engaging faces of said members being each inclined to the longitudinal axis of the main intake pipes, and the longitudinal axis of the short length of pipe, one of said members having a recessed seat formed in the face thereof and the other member having an extending lip which engages said recessed seat; substantially as described.

In testimony whereof I affix my signature, in presence of two witnesses.

WILLIAM STUART FOSTER.

Witnesses:
L. C. LEAVENS,
GRACE N. GOFF.